United States Patent
Nguyen et al.

(10) Patent No.: US 7,544,054 B2
(45) Date of Patent: *Jun. 9, 2009

(54) FLEXIBLE MOLDING DEVICE FOR MANUFACTURING A SUNKEN GROOVE IN A TIRE TREAD

(75) Inventors: Gia-Van Nguyen, Blagny (FR); Alain Emile Francois Roesgen, Asselborn (LU); Anne-France Gabrielle Jeanne-Marie Cambron, Mersch (LU); Peter Phelps Roch, Ettelbruck (LU); Marc Ernest Ginter, Mersch (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 97 days.

This patent is subject to a terminal disclaimer.

(21) Appl. No.: 11/879,684

(22) Filed: Jul. 18, 2007

(65) Prior Publication Data

US 2008/0152741 A1  Jun. 26, 2008

Related U.S. Application Data

(60) Provisional application No. 60/876,211, filed on Dec. 21, 2006.

(51) Int. Cl.
    *B29D 30/00* (2006.01)
(52) U.S. Cl. .................... 425/28.1; 425/37; 425/438; 425/470; 425/DIG. 58
(58) Field of Classification Search ............. 425/28.1, 425/35, 37, 46, 438, 470, 472, DIG. 58
See application file for complete search history.

(56) References Cited

U.S. PATENT DOCUMENTS

| | | | | |
|---|---|---|---|---|
| 5,075,067 A | * | 12/1991 | Rockarts et al. ............ 425/28.1 |
| 5,095,963 A | * | 3/1992 | Maitre .................... 152/209.18 |
| 5,843,326 A | * | 12/1998 | Bellot ........................ 249/104 |
| 6,193,492 B1 | | 2/2001 | Lagnier et al. |
| 6,408,910 B1 | | 6/2002 | Lagnier et al. |
| 7,338,269 B2 | * | 3/2008 | Delbet et al. ................. 425/37 |
| 2002/0134202 A1 | * | 9/2002 | Domange et al. .......... 76/101.1 |
| 2006/0137794 A1 | * | 6/2006 | Nguyen et al. ............. 425/28.1 |
| 2006/0144491 A1 | * | 7/2006 | Nguyen et al. ............. 425/28.1 |

FOREIGN PATENT DOCUMENTS

| | | |
|---|---|---|
| DE | 1274799 | 8/1968 |
| EP | 0450251 A1 | 9/1991 |
| EP | 0722816 A1 | 7/1996 |

(Continued)

OTHER PUBLICATIONS

European Search Report completed, Mar. 10, 2008.

*Primary Examiner*—James Mackey
(74) *Attorney, Agent, or Firm*—June E. Rickey

(57) ABSTRACT

A tire mold and a molding device for forming a sunken groove in a tire are provided. The molding device includes one or more rigid elements joined to a flexible member along an attachment point or line on the connecting surface of the rigid element. The flexible member is formed from a flexible material, preferably a superalloy, or hyperelastic material. If multiple rigid elements are utilized, the rigid elements are closely spaced together such that a portion of the opposed walls are in mating contact with an adjacent rigid element.

15 Claims, 6 Drawing Sheets

FOREIGN PATENT DOCUMENTS

| | | |
|---|---|---|
| EP | 0881103 A1 | 12/1998 |
| EP | 1243390 A2 | 9/2002 |
| EP | 1275527 A2 | 1/2003 |
| EP | 1676695 A2 | 7/2006 |
| WO | 99/21701 | 5/1999 |

* cited by examiner

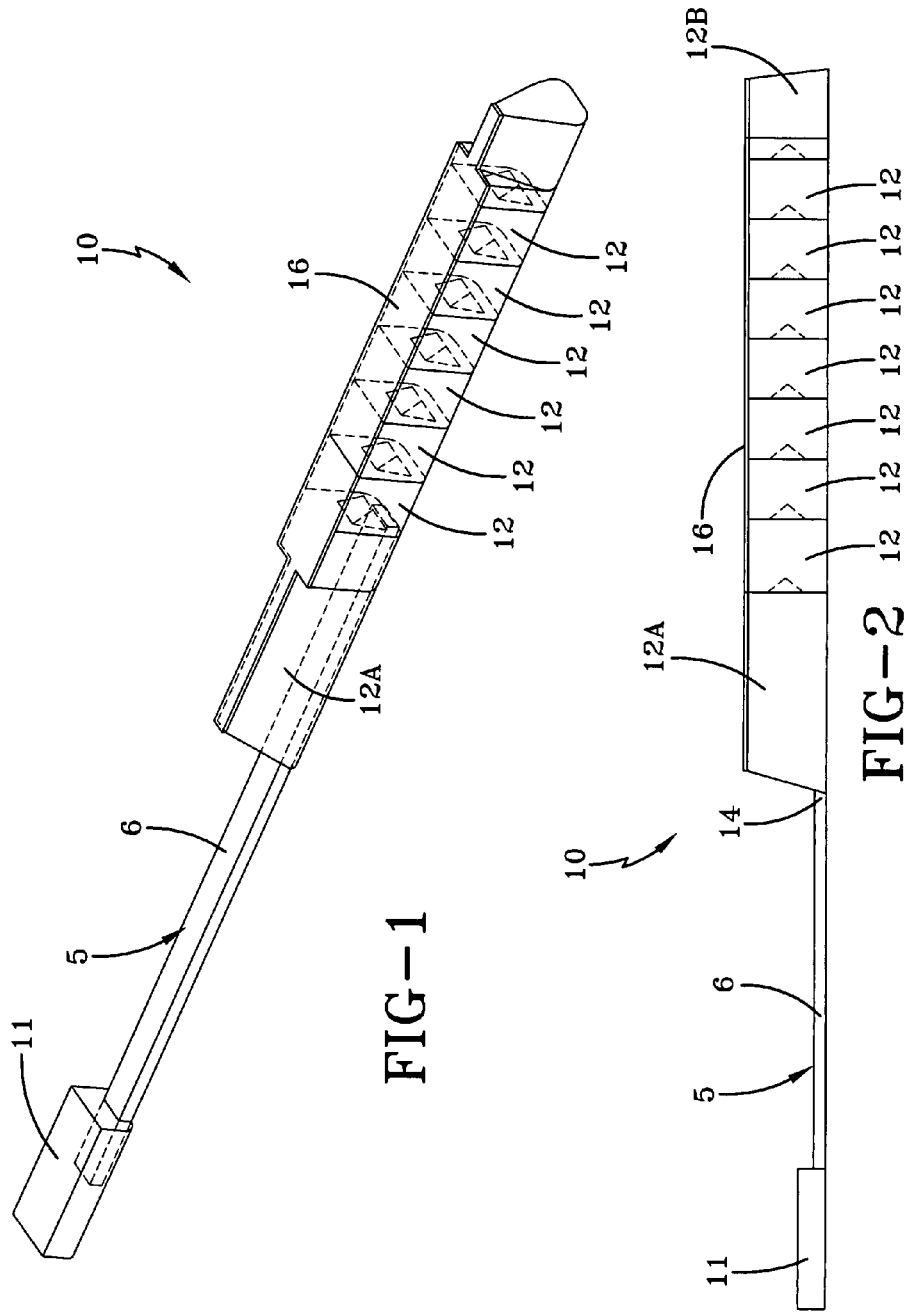

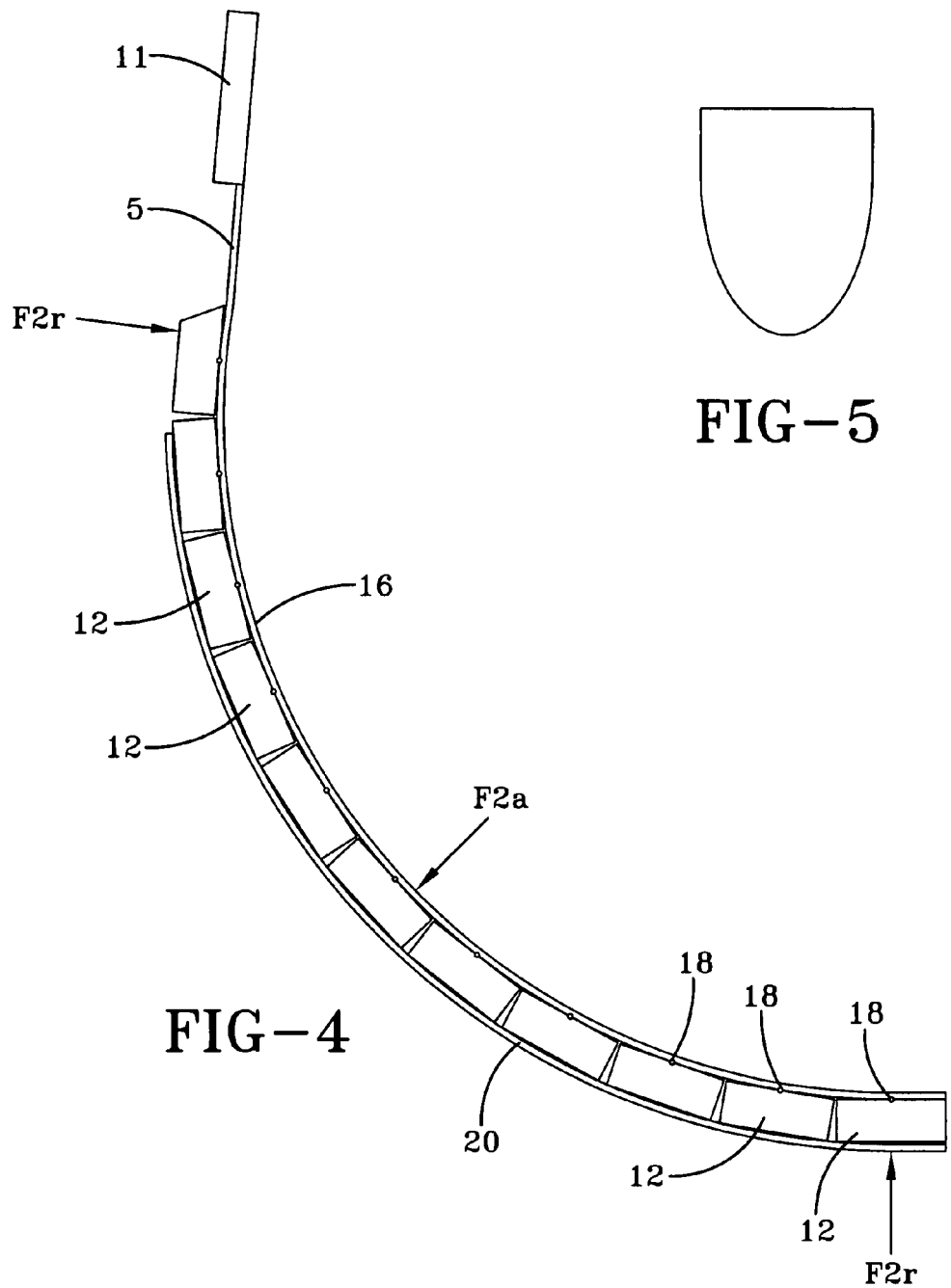

FLEXIBLE MOLDING DEVICE FOR MANUFACTURING A SUNKEN GROOVE IN A TIRE TREAD

This application claims the benefit of, and incorporates by reference, U.S. Provisional Application No. 60/876,211 filed Dec. 21, 2006.

FIELD OF THE INVENTION

The present invention relates to the molding of tires, and in particular, the molding of treads for a tire.

BACKGROUND OF THE INVENTION

The tread elements in relief on a tire tread, such as the sipes, tread blocks and grooves, play a fundamental role in tire traction or adhesion to the road both in the transverse direction and in the circumferential direction. Traction is especially critical when traveling on wet or snowy roads. For wet conditions, the grooves act as evacuation channels for trapping and evacuating water so that the tread blocks contact the ground.

As a tire wears, the volume of the tread, particularly the grooves, decrease due to frictional contact with the road surface. The reduced volume results in a degradation of performance. Eventually the tire will require replacement.

It is known in the prior art to attempt to solve the degrading tread condition through the use of sunken grooves, which are voids located below the surface of tire tread. The sunken grooves, due to a limitation in manufacturing, are generally oriented perpendicular to the shoulder region. Molding elements are typically used to form the sunken grooves, and they are often difficult to remove from the tire once the tire has been cured. To make a sunken groove, the mold elements need to be rigid enough to penetrate the uncured or green rubber tread, but flexible enough to be extracted from the cured tire without damaging the tire. Another requirement is that the sunken groove needs to be large and thick enough to be efficient, which leads to a molding element so stiff that its extraction would damage the tire tread or the element itself would fail by a fatigue fracture. Thus it is desired to have a method and apparatus of forming sunk grooves that does not have the disadvantages described above.

SUMMARY OF THE INVENTION

A molding device for forming a sunken groove in a tire is provided. The molding device includes one or more rigid elements joined to a flexible element along an attachment point or line on the lower surface of the rigid element. The flexible element is formed from a flexible material, preferably a superalloy, or hyperelastic material. If multiple rigid elements are utilized, the rigid elements are closely spaced together such that a portion of the opposed walls are in mating contact with an adjacent rigid element.

BRIEF DESCRIPTION OF THE DRAWINGS

The invention will be described by way of example and with reference to the accompanying drawings in which:

FIG. 1 is a schematic of a perspective view of a molding device for molding sunken grooves;

FIG. 2 is a is a side view of the molding device of FIG. 1;

FIG. 4 is a schematic of the molding device of FIG. 1 undergoing bending flexion when being removed from a cured tire;

FIG. 5 is a cross-sectional view of the molding device having a curved cross-sectional shape;

FIGS. 8A and 8B illustrates the sunken groove formed in the cured tire tread, wherein FIG. 8B illustrates the sunken groove in the direction 8B-8B of FIG. 8A;

DETAILED DESCRIPTION OF THE INVENTION

Figure 3:
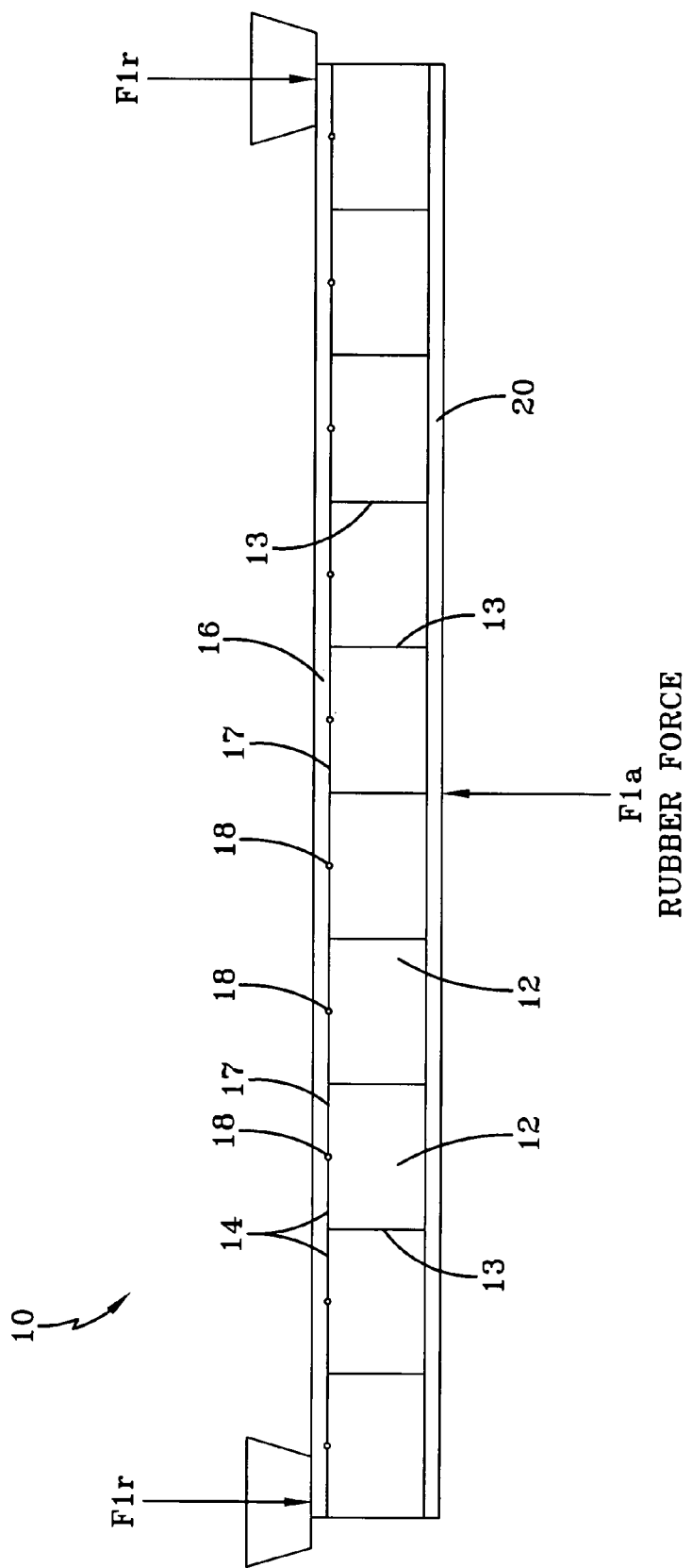
FIG. 3 is a schematic of a force diagram of the molding device of FIG. 1 illustrating the forces acting upon the molding device during cure.

FIG. 1 illustrates a first embodiment of a molding device 10, suitable for molding sunken grooves in a tire tread. A sunken groove is an empty void area or hole disposed underneath the new tread surface of a tire that is not visible or exposed when the tire is new or unworn, and that as the tire tread is worn during service, the sunken groove is exposed. The void may be substantially encapsulated underneath a tread block except for the exit slit from the tire, typically in a groove.

The molding device 10 includes an optional handle 5 having a distal end 11, a midsection 6 and a second end 14. The distal end 11 may be mounted in a tire mold in any desired orientation for forming sunken grooves. Mounted to the second end 14 is a lower surface 15 of a rigid element 12. The handle 5 may connect to element 12A at the bottom or top. The handle may also be connected to flexible member 16.

Two or more rigid elements 12 have a connecting surface 17 for connecting to a flexible member 16. The number of rigid elements may vary depending upon the groove size, typically from 2 to about 15. It is preferred that the connecting surface 17 be flat. Each element 12 is connected to the flexible member 16 in closely spaced relationship with an adjacent element 12 such that all or a portion of the sidewalls 13 of each element are in mating contact with the sidewalls 13 of an adjacent element 12. More preferably, one of the opposed sidewalls 13 of a first rigid element has a protrusion and the adjoining sidewall of an adjacent second rigid element has a groove for receiving the protrusion, forming an interlocking mechanism. Sidewalls 13 are preferably perpendicular to the connecting surface 17, but need not be so.

The elements 12 may be connected to the flexible member 16 via any method known to those skilled in the art, such as by laser welding. It is preferred that each element 12 be connected to the flexible member 18 only at an attachment point 18 or line. Preferably the attachment point or line is located at the midpoint or midplane of the connecting surface 17.

The elements 12 may be any desired size, but are preferably small in thickness. For example, the elements 12 may be about 1-6 mm thick (depth), preferably 2-4 mm, about 2-6 mm tall, preferably about 2-4 mm, and about 5-12 mm long. The elements may have any desired cross-sectional shape, such as square, round, trapezoid or rectangular blocks 12. However, the elements are not limited to block shapes, and may be curved or have a rounded cross-sectional shape such as shown in FIG. 5. The leading element 12a and trailing element 12b may have a smaller cross-sectional shape than the adjoining elements 12, with angled sidewalls for easier extraction from the mold. In addition, the longitudinal axis of the molding device 10 need not be linear, and may be nonlinear for example, curvilinear in shape or any other desired shape.

The elements 12 are made of a rigid material such as metal, for example, steel, aluminum or any other suitable material. The elements 12 may also be made of a rigid polymer or sintered material.

The flexible member 16 and optional handle 5 may be made of metal or any material or metal known by those skilled in the art to be suitable for use as a flexible member. The flexible member 16 and handle 5 may comprise very highly elastic, hyperelastic or superelastic materials such as shape memory alloys including, but not limited to, Nickel-Titanium alloys, CuZnAl, CuAlNi and CuAlBe. It is preferred that the flexible member 16 and the handle 5 be made from a material having an elastic limit greater than or equal to about 5% elongation, and more preferably greater than or equal to 10%. In addition, it is preferable that the flexible member 16 have a high modulus to ensure an accurate geometry to the sunken groove. The modulus has to be greater than 100,000 MPa, preferably greater than 180,000 MPa.

An optional protective layer 20 shown in FIG. 3 may be fixed to one of the elements 12 to extend over and form a protective layer over the elements 12 of the device 10. The protective layer may be made of an aluminum, steel, or a low friction material such as polytetrafluoroethylene, silicone rubber or other materials having a low friction coefficient. Alternatively, each element 12 may be coated with a low friction material.

In order for a molding device to be able to mold a sunken groove in a tire tread, the mold elements 12 need to be stiff or rigid enough to penetrate the green tire tread and be placed into the desired position prior to curing. Conversely, the molding device must be very flexible to be extracted or removed from the cured tire tread without damaging the tread surface. Further, the sunken groove must be large and thick enough in order for the groove to be of benefit. Typically of the size 8 mm by 4 mm. These competing requirements typically lead to a molding device that is so stiff that its extraction either damages the tire tread or results in the fatigue fracture of the molding device. The molding device 10 overcomes these requirements as explained, below.

FIG. 3 illustrates the molding device 10 under the flexion forces F1(a+r) which are caused by the green tire tread during insertion of the molding device prior to cure. The flexible member 16 together with the rigid elements 12 resist or counteract the flexion forces with force F1a. This is due to the interlocking effect of the mating sidewalls 13, which are held in compression against one another, thus resisting the bending moments from forces F1r. The elements 12 rigidity and the flexible member's 16 modulus provide the necessary high flexion stiffness to the molding device. However, when subjected to the inverse inflection as shown in FIG. 4 which occurs during demolding of the molding device from the tread, the forces F2(a+r) separate the elements 12 and the resulting bending stiffness of the molding device 10 is equal to the bending stiffness of the flexible member 16 only.

Figure 6:
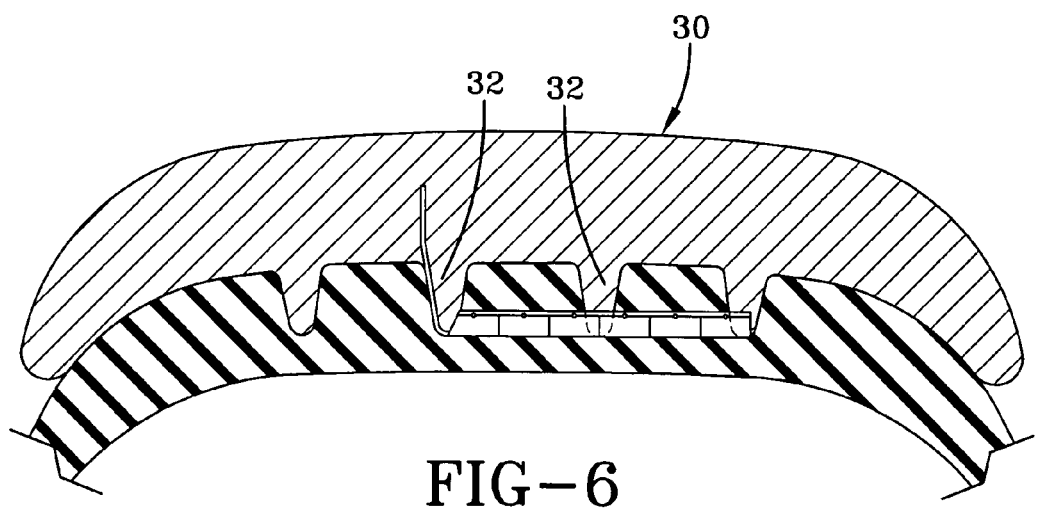
FIG. 6 illustrates the molding device mounted in a mold and inserted into a green tire tread prior to cure.

FIG. 6 illustrates one example of the molding device shown in use with an upper portion of a tire mold 30. The molding device 10 is embedded in the green tire tread prior to cure. The molding device 10 may be mounted to in any desired orientation to the tire mold, so that for example, the sunken groove may be oriented circumferentially, axially or any other desired configuration. The molding device may be mounted in the segments of the mold corresponding to the crown portion of the tread or located in the portions of the mold corresponding to the sidewalls. The tire mold 30 has an inner surface 32 having relief elements 32 for forming a respective groove 34 in a tire tread.

Figure 7:
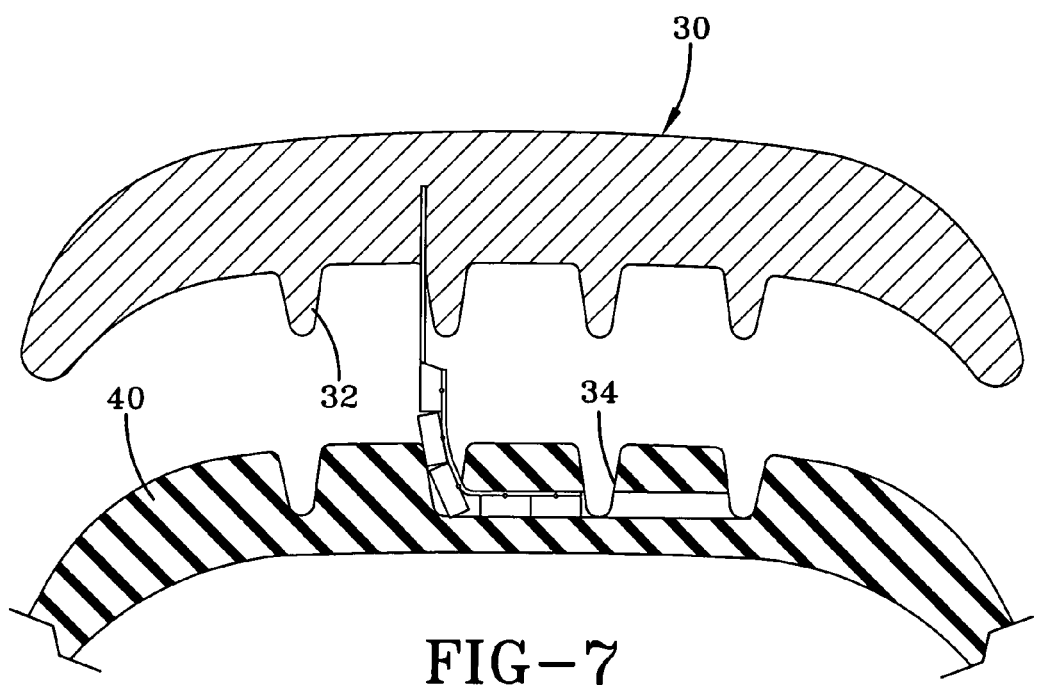
FIG. 7 illustrates the molding device being extracted from a cured tire tread.
Figure 8A:
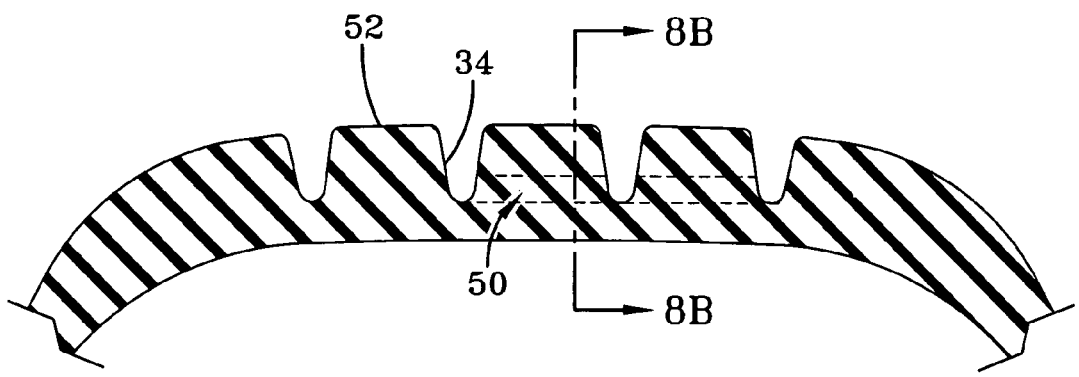
Figure 8B:
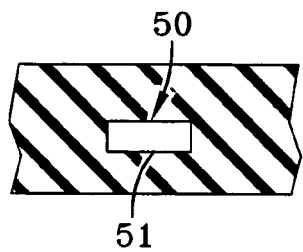

FIG. 7 illustrates the molding device 10 during extraction from the cured tire tread 40. The molding device is extracted from a groove 34 of the tire tread. As the molding device is pulled from the tread, the device elements separate allowing the flexible member to elastically deform so that the device can be extracted from the tread without damaging the tread. FIGS. 8A and 8B illustrate the sunken groove 50 formed below the tread surface 52 of the cured tire. As shown in FIG. 8A, the bottom surface 51 of the sunken groove 50 is preferably at the same level as the bottom of the other grooves 34 to allow water to flow from one to another.

Figure 9:
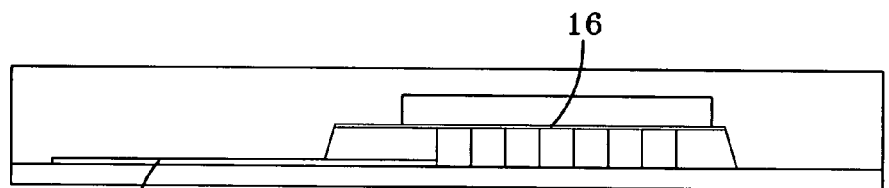
FIG. 9 illustrates a second embodiment of the molding device mounted in a mold.
Figure 10A:
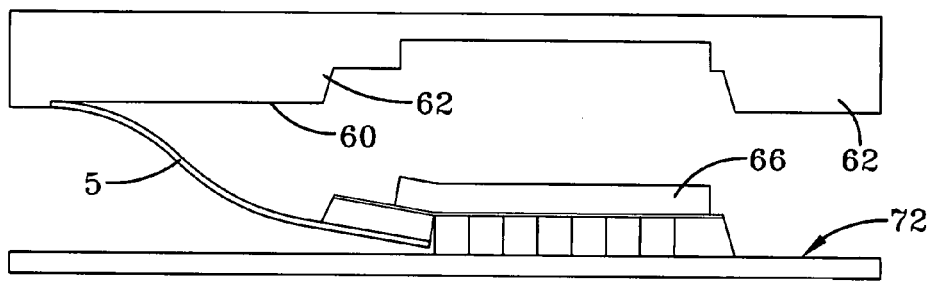
FIGS. 10A and 10B illustrate the molding device during extraction from the tread.
Figure 10B:
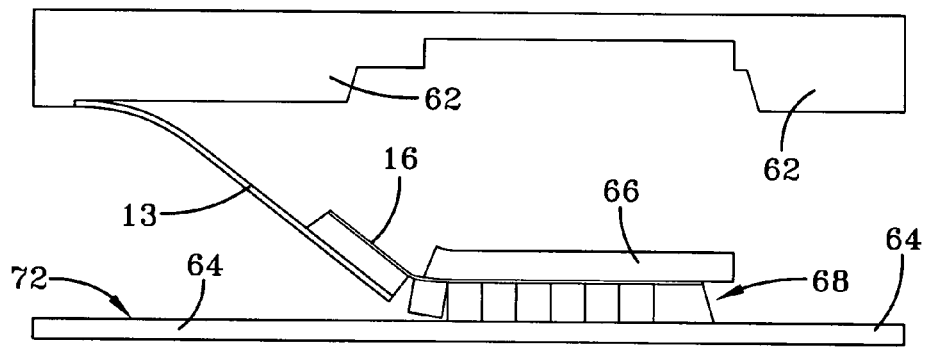

FIG. 9 illustrates a second variation of the molding device 10 installed in the tire mold 70 with tread rubber 72. The flexible handle 5 is shown installed flush with the bottom surface 60 of a mold relief element 62 of a tire mold 70. The mold relief element 62 forms a groove 64 in a tire tread disposed to adjacent tread blocks 66. The molding device 10 is positioned to form sunk grooves or voids 68 disposed under the tread blocks 66. FIGS. 9A and 9B illustrate the flexible handle 5 and flexible member 16 undergoing bending as the elements 12 are pulled from the cured tread rubber 72. The flexible member and handle are preferably formed of hyperelastic materials to reduce fatigue failure due to repeated cyclical bending loads.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A molding device for forming a sunken groove in a tire, the molding device comprising a plurality of rigid elements, and a flexible member, each rigid element having opposed walls, wherein the rigid elements are positioned such that a portion of the opposed walls are in mating contact with an adjacent rigid element, wherein the plurality of rigid elements are connected to the flexible member, and wherein the flexible member is formed from a flexible material.

2. The molding device of claim 1 wherein the flexible member is formed from a superelastic alloy.

3. The molding device of claim 1 wherein the flexible member is formed from a material having an elastic limit greater than or equal to 5% elongation.

4. The molding device of claim 1 wherein the flexible member is formed from a material having an elastic limit greater than or equal to 10% elongation.

5. The molding device of claim 1 wherein the plurality of elements are connected to the flexible member only at a point on a connecting surface of each said element.

6. The molding device of claim 1 wherein the plurality of elements are connected to the flexible member only along a line located on a connecting surface of each said element.

7. The molding device of claim 1 wherein the rigid elements have a square or rectangular cross sectional shape.

8. A mold for molding a tread band of a tire, the tread band being made of an elastomer compound, the mold comprising a mold surface for molding the tread and a molding device projecting from the mold surface so as to become embedded in the elastomer compound to be molded, wherein the molding device comprises a plurality of rigid elements, and a flexible member, wherein the plurality of rigid elements are connected to the flexible member, wherein each element has opposed walls, wherein the rigid elements are positioned such that a portion of the opposed walls are in mating contact with an adjacent rigid element, and wherein the flexible member is formed from a flexible material.

9. The mold of claim 8 wherein the flexible member is formed from a superelastic alloy.

10. The mold of claim 8 wherein the flexible member is formed from a material having an elastic limit greater than or equal to 5% elongation.

11. The mold of claim 8 wherein the flexible member is formed from a material having an elastic limit greater than or equal to 10% elongation.

12. The mold of claim 8 wherein the plurality of elements are connected to the flexible member only at a point on a lower surface of each said element.

13. The mold of claim 8 wherein the plurality of elements are connected to the flexible member only along a line located on a lower surface of each said element.

14. The mold of claim 8 wherein the rigid elements have a square or a rectangular cross sectional shape.

15. The mold of claim 8 wherein one of said opposed walls has a protrusion, and the other of said opposed walls has a groove for interlocking with said protrusion.

* * * * *